No. 675,205. Patented May 28, 1901.
A. D. ELBERS.
PROCESS OF TREATING BLAST FURNACE SLAG IN ITS MOLTEN STATE.
(Application filed Sept. 26, 1900.)
(No Model.)
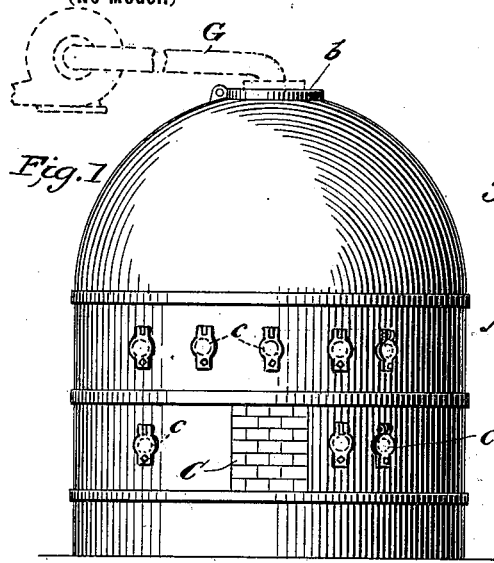
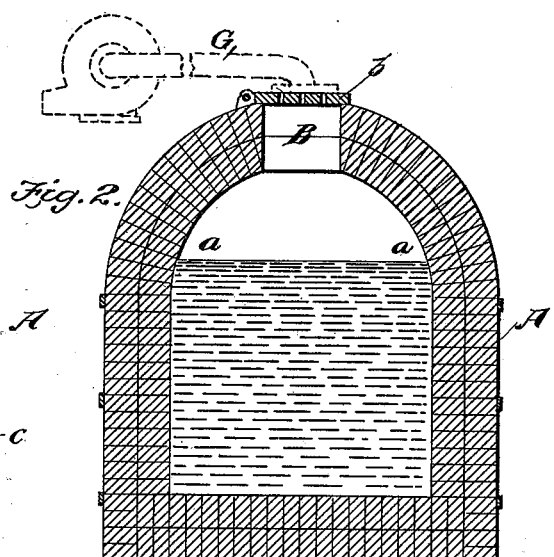
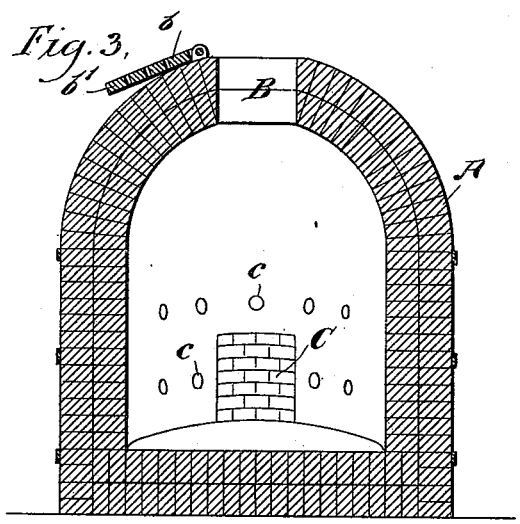
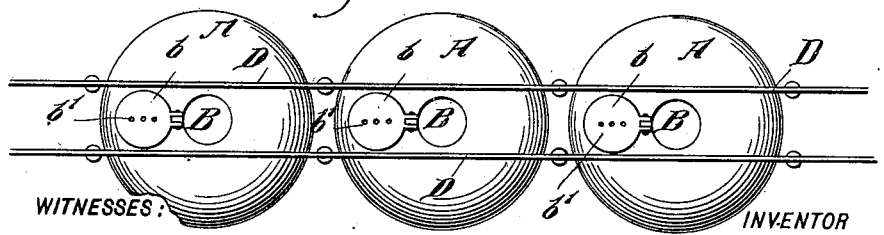
WITNESSES:
Edward Thorpe
INVENTOR
Alexander D. Elbers.
BY
ATTORNEYS

UNITED STATES PATENT OFFICE.

ALEXANDER D. ELBERS, OF HOBOKEN, NEW JERSEY.

PROCESS OF TREATING BLAST-FURNACE SLAG IN ITS MOLTEN STATE.

SPECIFICATION forming part of Letters Patent No. 675,205, dated May 28, 1901.

Application filed September 26, 1900. Serial No. 31,130. (No specimens.)

*To all whom it may concern:*

Be it known that I, ALEXANDER DANIEL ELBERS, a citizen of the United States, and a resident of Hoboken, in the county of Hudson and State of New Jersey, have invented a new and useful Improvement in Processes of Treating Blast-Furnace Slag in its Molten State, of which the following is a full, clear, and exact description.

My invention relates to a method of disintegrating blast-furnace slag, the object of which is to reduce the slag to a pulverulent and sufficiently soluble condition to render it available, as a cheap substitute for lime, for manuring the soil.

The invention consists in gathering and confining the molten slag in a kiln or other stationary receptacle having non-conducting walls for the retention of heat and leaving an air-space above the surface of the slag, said space having restricted communication with the atmosphere and regulating the communication between the air of this space and the atmosphere, whereby the air above the slag in said space becomes intensely heated by radiation from the molten slag and the cooling of the slag is retarded while the slag is in a state of transition to the solid form, all as hereinafter more fully described.

Reference is to be had to the accompanying drawings, forming a part of this specification, in which similar characters of reference indicate corresponding parts in all the figures.

Figure 1 is a side elevation of a kiln adapted for carrying out the improved method, the lid being closed over the aperture through which the slag is to be flushed into the kiln. Fig. 2 is a vertical section through the kiln with the lid in a closing position, a charge being represented in the kiln. Fig. 3 is a vertical section through the kiln, the interior appearing in perspective and the lid being in open position; and Fig. 4 is a plan view of a group of kilns with their covers opened and a plan view of a track crossing all of the kilns.

It is well known that subsilicate blast-furnace slag of the type known as "slacking-cinders" has a tendency to readily fall to powder on cooling, which is a chemical change, inasmuch as it is principally due to the splitting up of some of the constituent silicates of the slag. The pulverulent slag thus obtained sets like cement when it is gaged with water and is not suitable for manuring, because it clogs the soil.

It is also known that blast-furnace slag of the more usual composition and of subsilicate to singulosilicate constitution hardens to a stone-like consistency when dumped on the cinder-bank in the usual manner, but that it can be made to disintegrate into a more or less pulverulent mass by flushing it into a ditch or pit in sufficiently large volume to make it cool very gradually. This is chiefly a physical change brought about by the sulfids of the slag, which have a tendency to segregate from the silicates of the mass when the latter cools so slowly as to pass gradually from the liquid to the solid state. Such pulverulent slag does not clog the soil when it is mixed with it, and it can be used to advantage for liming the soil, especially under conditions where the soil is also benefited by the accretion of the amorphous silica, which the slag carries. Flushing the molten slag into pits or ditches, however, is not sufficient to bring out its desirable conditions—pulverulence and solubility—to the fullest extent, inasmuch as the pitted or ditched slag readily chills on the surface and then forms a thick skull or crust, which exerts sufficient pressure on the still liquid interior to check the tendency of its particles to segregate, and this also involves that the said particles do not turn out as soluble as they would become if they were relieved from that pressure while solidifying.

In order to secure more satisfactory results, I flush the fresh-tapped slag into kilns or other covered stationary receivers in which, when they are filled to about three-fourths of their capacity, the loss of the heat that radiates from the surface of the molten slag will be minimized by the reverberatory action of the dome or roof of the receiver. The slag is to be poured in from the top through an aperture that can be readily closed or partly closed, and by regulating the escape of heat through this aperture in a judicious manner, by partly or entirely closing this aperture, as hereinafter described, the air-space above the slag-line can be kept for a considerable time—at least for several hours—at a temperature of about 1,000° centigrade. The maintenance of this high temperature retards the formation of a rigid crust on the surface of the molten slag, and thereby allows the latter the freedom of molecular motion while it is solidifying. It might be supposed that still better results could be attained by reducing the atmospheric pressure on the surface of the molten slag by means of an exhauster applied in such manner as to produce a partial vacuum in the air-space above the slag-line; but I am of the opinion that such a condition is actually brought about by the intense heat that radiates out of the kiln while the aperture is left open, which I explain as follows: The said heat rapidly expands the atmospheric air contiguous to or above the aperture in question. The rapid expansion produces a whirling motion of the air-column thus affected. The centrifugal force of this whirling motion has the effect of decreasing the density of the central portion of the air-column. The partial vacuum thus created above the kiln-aperture removes a corresponding portion of atmospheric pressure from the space below it, and the partial vacuum thus established in the air-space above the slag-line will maintain itself as long as the radiation of heat is sufficiently intense to rapidly expand the atmospheric air that comes in touch with the kiln-aperture. As regards the character of the slag that is suitable for this treatment, as well as for the intended utilization, it may be assumed that compositions having an oxygen ratio of from two-thirds to one to about one to one, high in lime and low in magnesia and nearly free from oxids of manganese and iron, are the more desirable.

I now proceed to describe how the invention may be carried out.

The kiln A represented is supposed to be fourteen feet high, twelve feet base, and eight feet in diameter in the clear, with a capacity of about seventy thousand pounds of slag when filled about eight feet high, up to the line $a$ $a$, which I call the "slag-line."

B is an aperture from two to three feet in diameter, through which the slag is to be flushed into the kiln A from a car or otherwise, and $b$ is a lid, that is preferably so adjusted that it can be partially lifted, shoved sidewise, or entirely removed. This lid should have one or more air-holes $b'$, of about one inch in diameter, in the center.

C is a discharge-door, which has to be bricked up and luted before a kiln is charged with slag, and $c$ $c$ $c$ are air-holes from two to three inches in diameter, which are to be plugged from within and which can be easily forced open from without when test-pieces are to be drawn or when air is to be let in.

In Fig. 4 I have illustrated a top view of three kilns in a row with the intake-apertures open, and in this figure D D D represent an elevated track running about three feet above the intake-apertures, on which the molten slag is to be conveyed from the blast-furnace to the kilns. The kilns should be constructed of fire-brick, and the inside up to the slag-line should be lined with fire-brick that offers sufficient resistance to the cutting action of the molten slag, such as composite fire-brick, which is made from a mixture of fire-clay, coke or coal dust, and tar. The lid $b$ is best fashioned from a block of slate or other refractory rock that withstands sudden changes of temperature.

Before a kiln is filled it should be preheated, and it may be got ready for the charge in the following manner: First the air-holes $c$ $c$ $c$ are to be plugged from the inside with balls of composite fire-clay or other suitable material, and later on these holes are to be filled up from the outside with pieces of calcined fire-clay and shut up with tightly-fitting cast-iron lids, so as to prevent the breaking out of the molten slag in case the inside plugs should give way. Then, after placing a pile of wood or charcoal on the floor, the discharge-door C is to be bricked up and luted, leaving only a small opening at its bottom for kindling the fire and for draft. After the fire has nearly died out this opening is also luted, and then the kiln is ready for a charge.

After a kiln has been filled with slag up to the slag-line $a$, the suitable height of which has to be determined in practice, I regulate communication with the interior, for which purpose the intake-aperture B is closed by the lid $b$, but the air-holes $b'$ in the center of the lid are left open, and if the escape of gases through these holes should be rather forcible or violent it may be advisable to raise the lid somewhat or shove it sidewise until the pressure has subsided. After the lapse of about two or three hours an iron bar should be passed through one of the air-holes $b'$ into the charge in order to ascertain whether the slag is still fluid or at least yielding on its surface or whether it has formed a hard crust, and in the latter case it is advisable to force a hole into the crust and to keep it open. This test should be repeated at suitable intervals until it becomes apparent that the slag has become disintegrated to a depth of about three or four inches from the surface, and then the intake-lid should be entirely thrown open and kept open. Then the air-holes $c$ may be opened, beginning at the top row, and finally after it has been ascertained that the interior of the charge has solidified the discharge-door C is opened.

It is impossible to tell beforehand how long it will take before the charge can be drawn; but it is likely that it will not take more than ten days to cool a charge of the volume herein described sufficiently to be drawn and probably less time, considering that the slag can be shoveled out nearly red hot after the discharge-door has been open for awhile.

Instead of using elevated tracks D the slag may be conveyed to the kilns by an aerial wire-rope tramway or the kilns may be built on a depressed plane, so that the intake will be nearly on a level with the adjoining ground, and instead of preheating the kilns with solid fuel gas fuel may be used to advantage. Such details depend, however, on local conditions and are well known to the managers of blast-furnaces.

In Figs. 1 and 2 I have shown in dotted lines the application of a suction-fan or exhauster to the top of the kiln for producing a partial vacuum above the slag by an extraneous agency, as hereinbefore referred to.

Having thus described my invention, I claim as new and desire to secure by Letters Patent—

The herein-described method of disintegrating molten blast-furnace slag; which consists in gathering and confining the molten slag in a kiln or other stationary receptacle having non-conducting walls for the retention of heat, and leaving an air-space above the surface of the slag, said space having restricted communication with the atmosphere, and regulating the communication between the air of this space and the atmosphere, whereby the air above the slag in said space becomes intensely heated by radiation from the molten slag and the cooling of the charge is retarded while the slag is in a state of transition to the solid form substantially as described.

In testimony whereof I have signed my name to this specification in the presence of two subscribing witnesses.

ALEXANDER D. ELBERS.

Witnesses:
J. FRED. ACKER,
JNO. M. RITTER.